(12) United States Patent
Song et al.

(10) Patent No.: US 7,784,272 B2
(45) Date of Patent: Aug. 31, 2010

(54) CONTROL SYSTEM FOR AN ENGINE AFTERTREATMENT SYSTEM

(75) Inventors: Qingwen Song, Columbus, IN (US); Guoming George Zhu, Novi, MI (US); Jerilyn Tsai, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 10/930,994

(22) Filed: Aug. 31, 2004

(65) Prior Publication Data

US 2006/0042234 A1     Mar. 2, 2006

(51) Int. Cl.
*F01N 3/00* (2006.01)

(52) U.S. Cl. .............................. 60/286; 60/274; 60/276; 60/295; 60/301; 60/303; 701/104; 701/109

(58) Field of Classification Search ................... 60/274, 60/276, 285, 286, 295, 301, 303; 422/180, 422/182, 183; 701/101, 104, 109
See application file for complete search history.

(56) References Cited

U.S. PATENT DOCUMENTS

| | | | |
|---|---|---|---|
| 5,047,220 A * | 9/1991 | Polcer | 423/239.1 |
| 5,067,320 A | 11/1991 | Kanesaki | |
| 5,233,934 A | 8/1993 | Krigmont et al. | |
| 5,410,873 A * | 5/1995 | Tashiro | 60/276 |
| 5,628,186 A | 5/1997 | Schmelz | |
| 5,643,536 A | 7/1997 | Schmelz | |
| 5,682,317 A | 10/1997 | Keeler et al. | |
| 5,703,777 A | 12/1997 | Buchhop et al. | |
| 5,785,937 A | 7/1998 | Neufert et al. | |
| 5,924,280 A | 7/1999 | Tarabulski | |
| 6,048,510 A | 4/2000 | Zauderer | |
| 6,082,102 A * | 7/2000 | Wissler et al. | 60/286 |
| 6,120,580 A | 9/2000 | Sandler | |
| 6,125,629 A | 10/2000 | Patchett | |
| 6,145,302 A | 11/2000 | Zhang et al. | |
| 6,151,547 A | 11/2000 | Kumar et al. | |

(Continued)

FOREIGN PATENT DOCUMENTS

EP          05792413          3/2009

(Continued)

OTHER PUBLICATIONS

English Abstract of JP 2003 027925.

*Primary Examiner*—Tu M Nguyen
(74) *Attorney, Agent, or Firm*—Krieg DeVault LLP; J. Bruce Schelkopf; L. Scott Paynter

(57) ABSTRACT

An engine exhaust treatment system using a control system is described. In one form of the present invention, engine exhaust gas contaminates are passed through a selective reduction catalyst and a contaminate reducing agent is injected into the catalyst. The amount of contaminates present in the exhaust proximate to the selective reduction catalyst are sensed using at least one sensor. In one embodiment, input signals are sent to a control system from the sensor or sensors and a feedforward control combined with a feedback loop is used to transform these signals and a predetermined catalyst output contaminate value into an output signal. The output signal instructs a provider to inject contaminate reducing agents in a manner to efficiently track the desired predetermined catalyst output contaminate value.

20 Claims, 4 Drawing Sheets

U.S. PATENT DOCUMENTS

| | | |
|---|---|---|
| 6,248,134 B1 | 6/2001 | Damhus et al. |
| 6,295,809 B1 | 10/2001 | Hammerle et al. |
| 6,305,160 B1 * | 10/2001 | Hammerle et al. ............ 60/274 |
| 6,427,439 B1 * | 8/2002 | Xu et al. ........................ 60/286 |
| 6,502,390 B2 * | 1/2003 | Goerigk et al. ............... 60/286 |
| 6,546,720 B2 * | 4/2003 | van Nieuwstadt ............ 60/286 |
| 6,755,014 B2 * | 6/2004 | Kawai et al. .................. 60/286 |
| 6,993,900 B2 * | 2/2006 | Upadhyay et al. ............. 60/286 |
| 6,996,975 B2 * | 2/2006 | Radhamohan et al. ........ 60/286 |
| 7,047,729 B2 * | 5/2006 | van Nieuwstadt et al. ..... 60/286 |
| 2004/0055284 A1 * | 3/2004 | Ripper et al. ................. 60/286 |
| 2004/0074229 A1 | 4/2004 | Upadhyay et al. |
| 2004/0098968 A1 | 5/2004 | van Nieuwstadt et al. |
| 2004/0098974 A1 | 5/2004 | van Nieuwstadt et al. |

FOREIGN PATENT DOCUMENTS

| | | |
|---|---|---|
| JP | 2003 027925 A | 1/2003 |

\* cited by examiner

| exh. flow (lb./hr) | 0 | 510 | 596 | 680 | 786 | 964 | 1132 | 1368 | 1638 | 1929 | 2145 | 2329 | 2611 | 3000 |
|---|---|---|---|---|---|---|---|---|---|---|---|---|---|---|
| $T_d$ (ms) | 515 | 515 | 515 | 447 | 390 | 320 | 270 | 220 | 190 | 160 | 150 | 130 | 113 | 113 |
| $\alpha$ | 0 | 0 | 20 | 20 | 20 | 20 | 20 | 20 | 20 | 20 | 20 | 20 | 20 | 20 |
| $\beta$ | 0 | 0 | 6 | 6 | 5.2 | 4.6 | 4 | 3.4 | 2.9 | 2.6 | 2.2 | 1.9 | 1.4 | 1.4 |

TRANSIENT PERFORMANCE INDEX

CONTROL SYSTEM FOR AN ENGINE AFTERTREATMENT SYSTEM

TECHNICAL FIELD OF THE INVENTION

This invention relates generally to control systems, particularly to a feedforward control system with feedback for urea Selective Catalytic Reduction regeneration.

BACKGROUND OF THE INVENTION

Reducing the exhaust NOx emission of diesel engines has become a major challenge over the past decade and will continue to be the major focus in the future due to the continuing stringent emission requirements for diesel engines. Engines exhaust NOx reduction can be achieved by combustion optimization and/or exhaust gas aftertreatment. In reality, combustion optimization with Exhaust Gas Recirculation (EGR) can only reduce the exhaust NOx to a certain level, further NOx reduction requires exhaust gas aftertreatment. The urea Selective Catalytic Reduction (SCR) Engine Aftertreatment System (EAS) is one of the main aftertreatment technologies with a high potential for reducing NOx.

The urea SCR technology is a very efficient steady state NOx reduction approach that has been successfully applied to stationary electrical generation sets powered by diesel engines with very stringent emission requirements. One of the greatest challenges in NOx reduction for SCR EAS is when the target engine exhaust NOx level reduces to a very low level. The steady state and transient control must be accurate enough to avoid ammonia (NH$_3$) slip, otherwise an alternate pollutant is released. A baseline control, basically a step control as a function of the desired NOx reduction quantity, has been developed and evaluated demonstrating poor transient performance and large steady state error.

Accordingly, improved control systems are needed to (a) improve transient NOx reduction and (b) reduce ammonia slip, especially when the engine is in transition. The present invention is directed towards meeting these and many other needs.

SUMMARY OF THE INVENTION

The present invention is described solely in claims and the present section is not intended to limit or expand the scope of protection described in the claims. Some forms of the present invention include a method and a system to reduce the initial transient lag in contaminate reduction and reduce the steady state error occurring upon the injection of a contaminate reducing agent into a selective reduction catalyst.

One form of the present invention is a method of first providing a selective reduction catalyst having a catalyst input and a catalyst output. A first catalyst condition is then determined at the catalyst input and a second catalyst condition is determined at the catalyst output. Next, a predetermined ideal catalyst output condition is provided Data relating to said catalyst conditions are inputted into a control system that generates an output signal utilizing a feedforward control. A feedback control updates the output signal. The updated output signal then instructs a provider to supply a contaminate reducing agent to the selective reduction catalyst.

An alternate form of the present invention includes a system with an engine that produces contaminates having an output, a selective reduction catalyst having an input and an output, wherein the input is operatively coupled to the exhaust gas output, at least one sensor operatively coupled to the selective reduction catalyst, a provider for providing a contaminate reducing agent, and a control system utilizing a feedforward control with a feedback loop. The control system transforms data from the sensor into an output signal that instructs the provider to inject said contaminate reducing agent.

DESCRIPTION OF THE PREFERRED EMBODIMENTS

Figure 1:
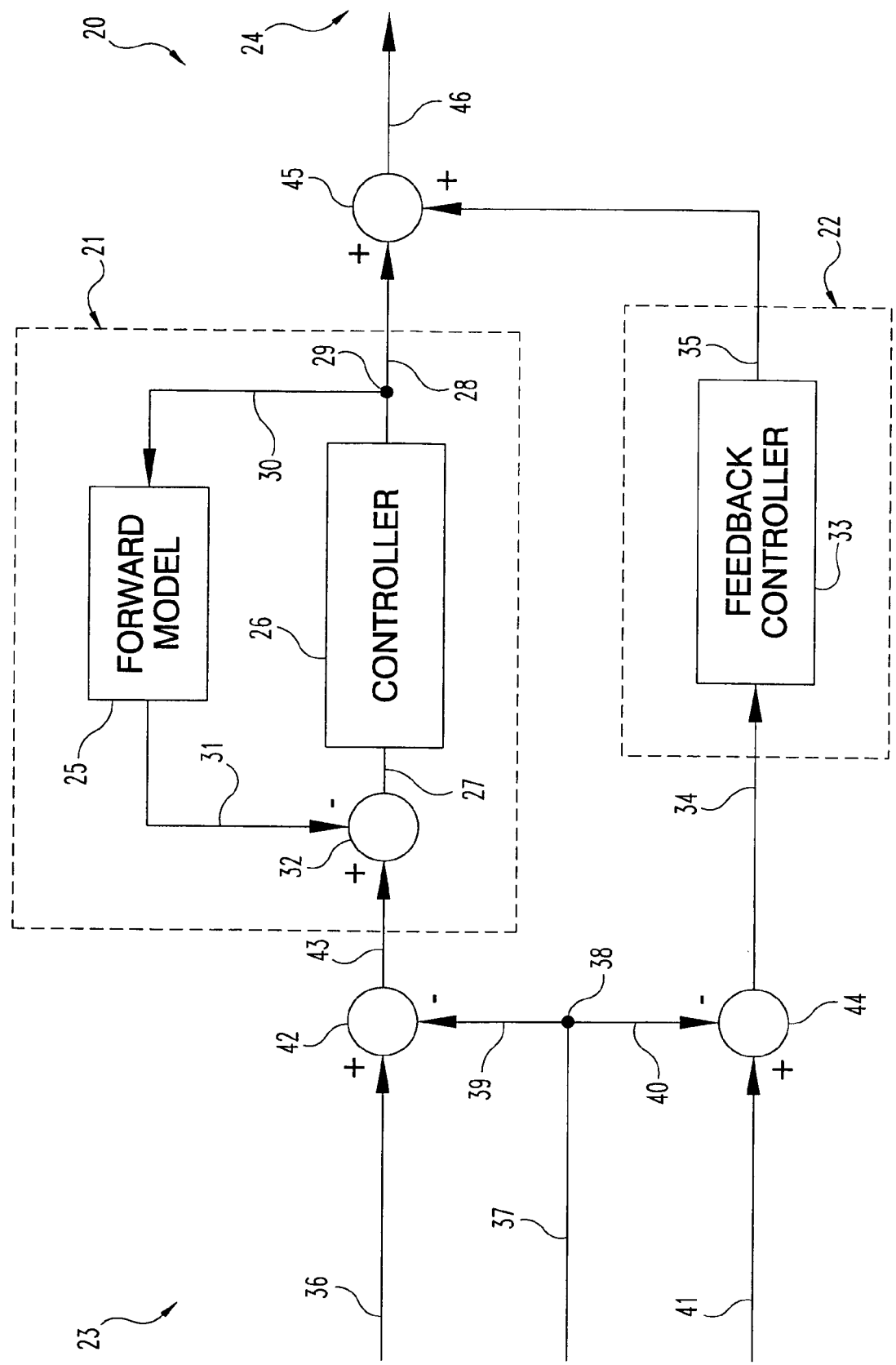
FIG. 1 is an illustration of a block diagram of one form of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations, modifications, and further applications of the principles of the present invention as illustrated herein being contemplated as would normally occur to one skilled in the art to which the invention relates.

Referring now to the drawings, one embodiment of the present invention is described in FIG. 1. Control system 20 includes feedforward control 21 and feedback control 22. Inputs 23 enter control system 20 and are transformed into an output 24. In this embodiment, the inputs may relate to present operating conditions of the engine, exhaust gas, catalyst or injection systems. The output may be a signal to the injection systems, or the pump supplying the NOx reduction agent.

Feedforward control 21 includes a forward model 25 and a controller 26. Forward model 25 is a mathematical model that approximates how quickly the decrease in NOx in the exhaust gas occurs after the injection of a NOx reducing agent such as urea. Preferred embodiments of these mathematical models are described in more detail hereinbelow with respect to FIG. 3. Controller 26 is preferably a proportional-plus-integral (PI) controller. A PI controller is a mathematical model to help reduce the steady state error of a system. This mathematical model is described in more detail hereinbelow with respect to FIG. 6. Signal 27 enters controller 26 and is transformed by controller 26 to produce signal 28. Signal 28 splits at point 29 and branch signal 30 enters forward model 25. Forward model 25 transforms branch signal 30 into signal 31. Signal 31 is combined with signal 43 at junction 32 to reproduce a new signal 27.

Feedback control 22 includes a feedback controller 33. Feedback controller 33 is a mathematical model to transform control signal 34 to produce a feedback signal 35. Control signal 34 is preferably formed by the combination of two of the three inputs 23 to control system 20.

In one embodiment, three input signals provide data to be processed by control system 20. In this embodiment, input signal 36 provides data concerning the amount of NOx present in the exhaust gas at the catalyst input. Also in this embodiment, input signal 37 provides a value indicative of the desired NOx to be present in the exhaust gas at the catalyst output. Input signal 37 splits at connection point 38 into first branch signal 39 and second branch signal 40. First branch signal 39 is combined with input signal 36 at junction 42. This combination of first branch signal 39 and input signal 36 provides the data necessary to produce a signal 43 that references the amount of NOx reduction necessary based on differences between the amount of NOx present in the exhaust line and the desired amount. Second branch signal 40 is combined with input signal 41 at junction 44. The third signal of this embodiment, input signal 41, provides the amount of NOx present in the exhaust gas at the catalyst output. The combination of second branch signal 40 and input signal 41 provides the data necessary to form control signal 34 representing the difference between the amount of NOx exiting the catalyst and the desired amount of NOx to exit the catalyst. Control signal 34 is transformed by feedback controller 33 to produce feedback signal 35. Feedback signal 35 is combined with signal 28 at junction 45 to produce output signal 46. In this embodiment, output signal 46 controls the injection of urea by the contaminate reducing agent injecting system.

The operation of control system 20, according to the present embodiment is as follows. In this embodiment, control system 20 operates to produce an output 24 based on inputs 23. Input signal 36 and input signal 37 are combined at junction 42. Input signal 36 provides the NOx present at the inlet of the catalyst through the use of a NOx sensor or other NOx sensing apparatus commonly known to one skilled in the art. Input signal 37 is the amount of NOx desired to exit the outlet of the catalyst to be treated using the SCR EAS system. This difference is used to determine the amount of NOx that must be reduced by the catalyst. This information is provided to feedforward control 21 via signal 43.

The data provided by signal 43 does not accurately account for the true amount of NOx reducing agent to be injected to reduce the level of NOx referenced by signal 43. Upon injection of the NOx reducing agent, the amount of NOx gas present in the exhaust does not instantaneously reduce to the target NOx level, achieving the target takes time. In this embodiment, feedforward control 21 therefore corrects signal 43 to accommodate for the failure of the NOx gas to instantaneously move toward the target NOx level. Moreover, in this embodiment the feedforward control 21 also corrects for the potential to over or under shoot the desired level. The more detailed complexities of feedforward control 21 are discussed hereinbelow with reference to FIG. 6. Signal 43 is corrected and signal 28 is output to junction 45.

A feedback signal 35 is also provided to junction 45 to account for the present effectiveness of the catalyst or the NOx reducing agent injection to reduce the NOx gas present in the exhaust. Feedback signal 35 is developed by input signal 37 and input signal 41 combining at junction 44 to produce control signal 34. Input signal 37 provides data concerning the desired target NOx amount and input signal 41 provides data concerning the amount of NOx present at the output of the catalyst. This difference informs control system 20 how effective the catalyst or the injected NOx reducing agent is in achieving the desired target NOx amount. This data is provided to feedback controller 33 via control signal 34. Feedback controller 33 transforms control signal 34 into feedback signal 35. Feedback signal 35 is combined with signal 28 at junction 45. This combination updates signal 28 to accommodate for present effectiveness of the catalyst and/or injection of the NOx reducing agent to push the level of NOx in the exhaust to an acceptable level. In this embodiment, output signal 46 then instructs the NOx reducing agent injection system to inject an amount of NOx reducing agent to move the amount of NOx gas towards the target NOx amount quickly and effectively.

Figure 2:
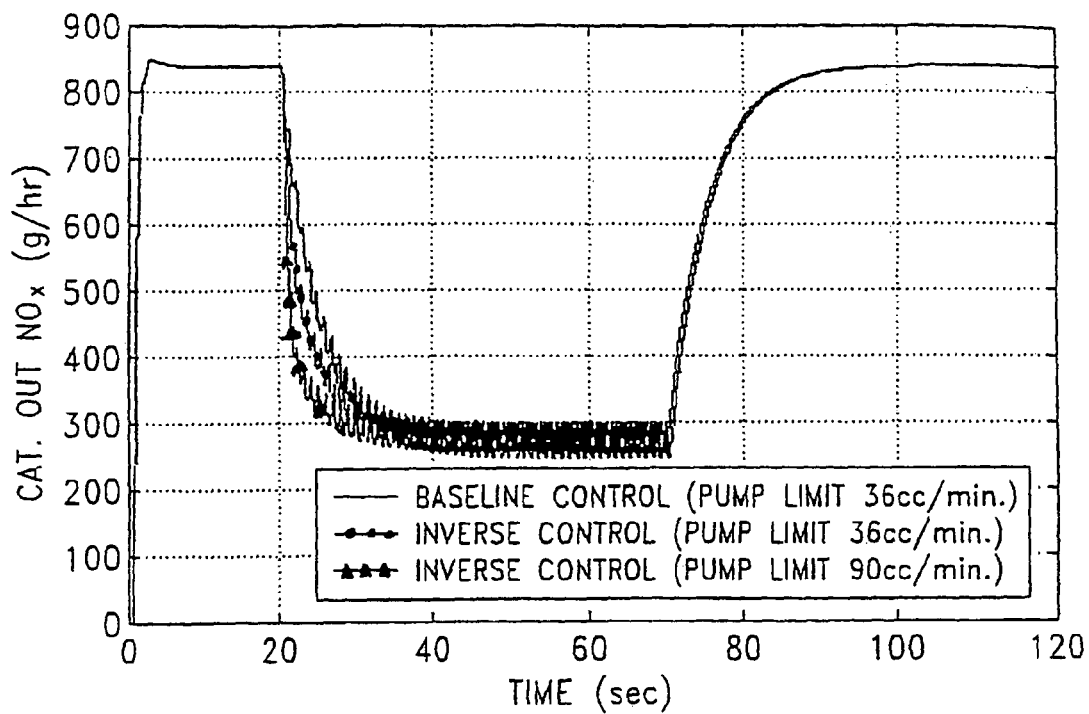
FIG. 2 is a graph describing the decrease in NOx gas in the exhaust over time after injection according to one embodiment of the present invention.

Referring now to FIG. 2, the development of the feedforward control 21 of one embodiment of the present invention is described in more detail. FIG. 2 displays tests that were performed to determine the transient catalyst output NOx based on different control systems and pumps. The data provided by FIG. 2 was used to create a mathematical model to approximate the behavior of the level of NOx gas present at the catalyst output. The system dynamics can be appropriately fitted as a time delay from a urea injection point to catalyst output plus a first order dynamics.

Figure 3:
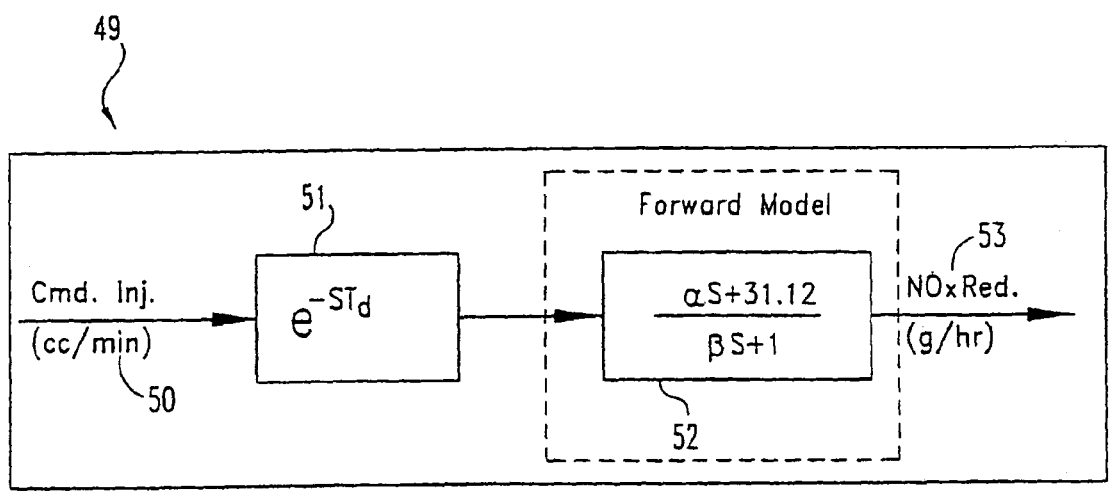
FIG. 3 is a block diagram of one embodiment of a forward model according to the present invention.

Referring now to FIG. 3, a schematic diagram is provided to describe the creation of the mathematical model of the present embodiment. Signal 50 represents a NOx reducing agent, such as urea, injection into system 49. Upon injection, the decay of the NOx gas present in the exhaust indicated in FIG. 2 as beginning at Time=20 is appropriately fitted by a first order mathematical system represented by block 51. This mathematical system is defined as:

$$e^{-sT_d}$$

where $T_d$ is the dead time from urea injection point to catalyst output point. This equation is inverted through the use of a Laplace transform to arrive forward model 52. Forward model 52 may be the forward model 25 described in the embodiment described in FIG. 1, but forward model 25 is not intended to be limited by forward model 52. The inverse of the mathematical system of block 51 provides the equation as depicted in block 52:

$$P(s) = \frac{\alpha s + 31.12}{\beta S + 1}$$

where $\alpha$ and $\beta$ are coefficients of the first-order lead/lag filter. $T_d$ and $\beta$ are functions of exhaust flow rate and $\alpha$ is set to be either zero when no emission control is required under low exhaust flow rate or a constant. The higher the constant value of $\alpha$ is selected, the more conservative the control. As described in block 52, in one embodiment, the DC gain is 31.12. For this embodiment two assumptions were made to achieve this value of DC gain: (a) a typical NO to $NO_2$ ratio in the turbo outlet exhaust is 9:1 and the stoichiometric urea requirement per unit NOx mass is 0.67 gram urea per NOx gram; and (b) the urea solution mass concentration is 32 percent and urea solution density is 1.086 grams/cc. By simple unit conversion and calculation, 1 cc per minute urea solutions eliminate 31.12 grams per hour of NOx by chemical reaction at a steady state. These values and assumptions are for the present embodiment described by system 49 but various other assumptions, mathematical models, and operating parameters may be used in accordance with the present invention. Block 52 thereby produces a signal 53 to provide data relating to the amount of NOx reduced.

Figures 4, 5:
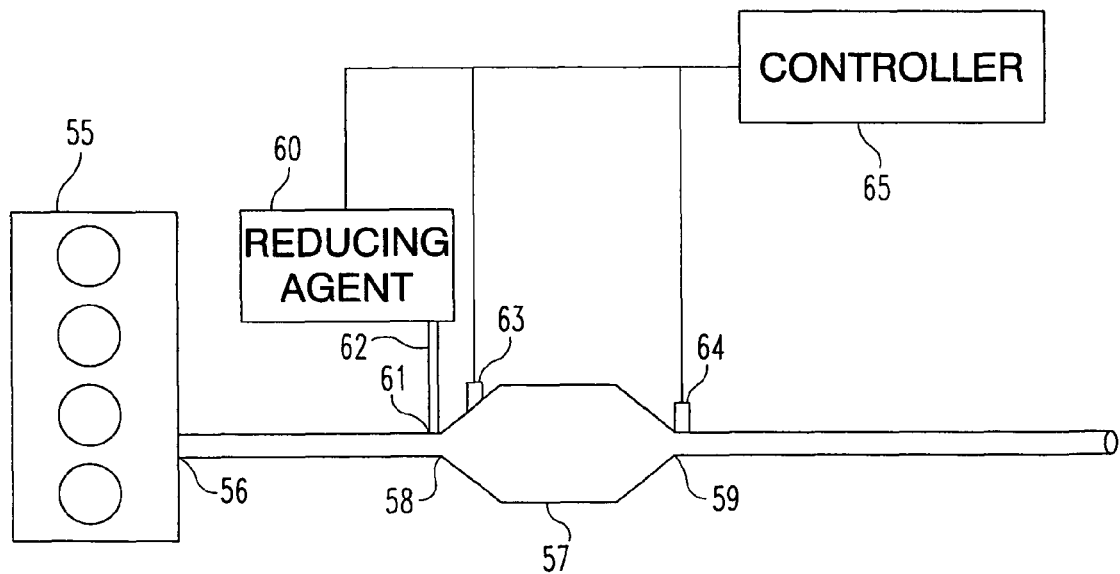
FIG. 4 is a table of constants that may be used in an embodiment of the present invention.
FIG. 5 is a schematic diagram of another embodiment of the present invention.

Referring now to FIG. 4, a table describing different values for $\alpha$ and $\beta$ in relation to different exhaust flow rates in lbs/hr depicting various values that may be used in differing embodiments of the present invention.

Referring now to FIG. 5, a physical embodiment showing the engine system that may be used in accordance with the present invention is described. An engine 55 having an output 56 produces exhaust gas containing contaminates. Selective reduction catalyst 57 includes an input 58 and an output 59. This embodiment also includes a supply tank 60 containing a contaminant reducing agent including an injector 61 and a supply line 62 to supply the reducing agent to the catalyst input 58. Preferably, injector 61 atomizes the contaminant reducing agent upon injection. A pump (not shown) may be used to move the contaminant reducing agent through the supply line. A sensor 63 determines the amount of contaminant present in the exhaust gas at the catalyst input 58 and a sensor 64 determines the amount of contaminant in the exhaust gas present at catalyst output 59. Controller 65 receives input from sensors 63 and 64 and outputs signals to reducing agent supply tank 60 in order to inject contaminate reducing agent via injector 61 into the exhaust gas entering catalyst 57 at input 58. This configuration describes one embodiment of the present invention; however, the present invention contemplates differing sensor positions and injection areas while still falling under the invention as claimed. Moreover, alternate physical systems may be used in accordance with the present invention.

Figure 6:
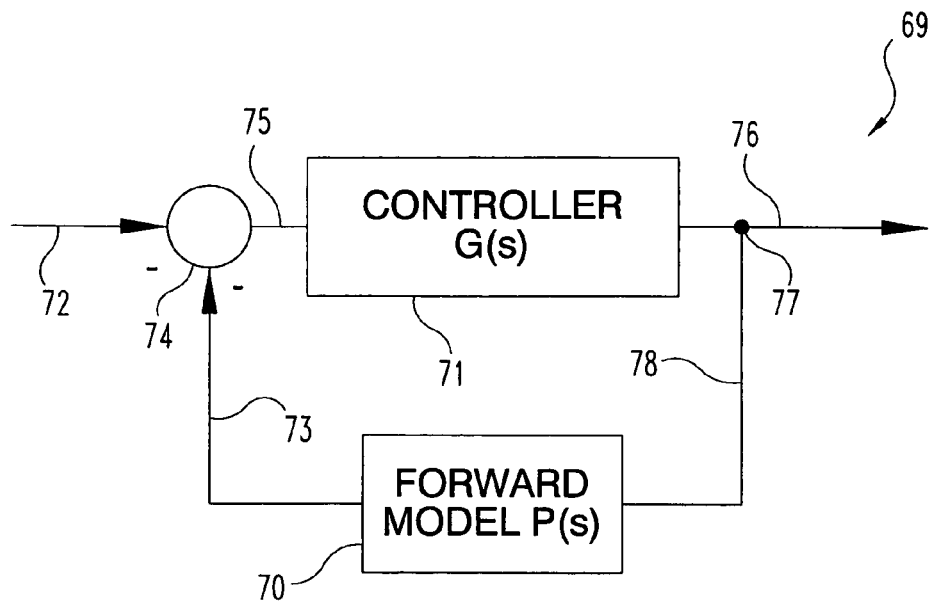
FIG. 6 is a block diagram of a feedforward control that may be used in one embodiment of the present invention.

Referring now to FIG. 6, one potential block diagram describing a mathematical model for one embodiment of the feedforward control 21 is described. Other block diagrams and mathematical models of feedforward control 21 known to those skilled in the art may also be used in accordance with the present invention. One embodiment of feedforward control 21 is described as a feedback inverse dynamic control 69 in FIG. 6. Feedback inverse dynamic control 69 includes a forward model represented by block 70 and a controller represented by block 71. Feedback inverse dynamic control 69 operates by first receiving an input signal 72. Input signal 72 is combined with signal 73 at junction 74. Signal 73, in one embodiment of the present invention, may relate to the correction for the non-linear aspects of the reduction of NOx gas in the exhaust upon injection. The combination of signal 72 and signal 73 results in signal 75.

Signal 75 is then transformed by controller 71 using a mathematical function described in FIG. 6 as G(s). In one embodiment of the present invention, the function G(s) can be represented mathematically as $$G(s) = k_p + \frac{k_i}{s},$$

where $k_p$ and $k_i$ are proportional and integral gains, respectively. Controller 71 then transforms signal 75 into output signal 76. Output signal 76 is split at connection point 77 into a branch signal 78 to be input into forward model 70. Output signal 76 also instructs the NOx reducing agent injection system to inject. The combination of the controller 71 and forward model 70 results in a feedback inverse dynamic control 69. In one embodiment of the present invention feedback inverse dynamic control 69 may be the mathematical model used in feedforward control 21 of FIG. 1. Feedback inverse dynamic control 69 may be represented mathematically as C(s) with the following equation:

$$C(s) = \frac{G(s)}{1 + G(s)P(s)} \cong \frac{1}{P(s)} \text{ as } G(s)P(s) \gg 1$$

Example No. 1

Figure 7:
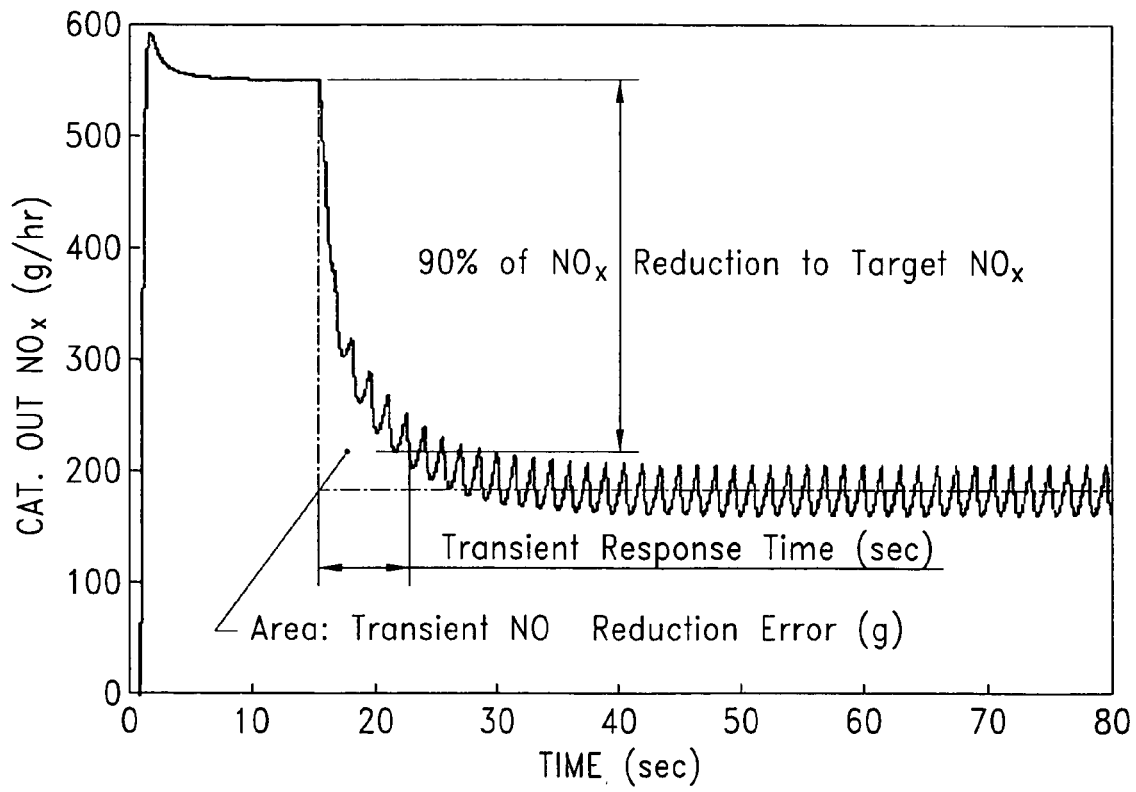
FIG. 7 is a graph describing the transient NOx reduction error and the transient response time in one embodiment of the present invention.

The first simulation was performed to determine the effect of this combination of the feedforward control and the feedback control and its effect on improving the transient and steady state response of the NOx reduction upon injection of the urea. FIG. 7 describes a transient performance index. The graph provided is a function of time and NOx at the catalyst output in (g/hr) and it shows the decay in the amount of NOx exiting the catalyst upon the injection of urea at 15 seconds. FIG. 7 defines the transient response time as the amount of time that passes from the injection of the urea until the 90 percent of the NOx reduction to target occurs. The target NOx in this case is below 200 (g/hr) shown by the horizontally orientated dotted line. Also, FIG. 7 defines the transient NOx reduction error. The transient NOx reduction error is the integration of the NOx amount over the target during the transient response time.

Three control system simulations were run at various engine speeds. One control used a simple step function. Another control used an inverse control. The last control used a feedforward control with feedback. The first simulation was performed using an engine speed of 1500 revolutions per minute (rpm) and torque at 292 pounds per feet (lb.-ft). The second simulation case was performed at the speed of 2000 revolutions per minute and a torque of 381 lb.-ft. The third simulation run utilized an engine speed of 2500 rpm and torque at 303 lb.-ft. The results of the experimentations showed the feedforward control with feedback averaging a 47.5 percent improvement in the quickness of reaching the target over base-line (step function) control. The inverse control showed an average of 30.5 percent improvement in the quickness of reaching the target over the base-line control. Therefore, the feedforward control with feedback shows the best performance among the three control systems used.

Moreover, the transient NOx reduction error was also shown to be reduced more effectively by the feedforward control with feedback. The feedforward control with feedback averaged a 44 percent improvement over the step control. The inverse control only averaged a 32.2 percent improvement over the step control. Overall, the feedforward control with feedback exhibited the best transient performance over the step control.

Example 2

In this test, the control system of one embodiment of the present invention was performed for the simulation of a real excavator. The excavator was run at 800 rpms, then shifted to 2000 rpms, and then returned to 800 rpms to simulate a real operating condition where the excavator idles and works. The total NOx reduction error by the step control over the test cycle was 6.88 grams NOx and the total NOx reduction error by the feedforward control with feedback was 5.27 grams. Thus, the feedforward control with feedback showed a 23.36 percent improvement over the step control in the ability to reduce NOx during the transient response.

While the invention has been illustrated and described in detail in the drawings and foregoing description, the same is to be considered as illustrative and not restrictive in character, it being understood that only a few embodiments have been shown and described and that all changes and modifications that come within the spirit of the invention are desired to be protected.

What is claimed is:

1. A method comprising:
providing a selective reduction catalyst having a catalyst input and a catalyst output;
determining a first catalyst condition at said catalyst input and a second catalyst condition at said catalyst output;
providing a predetermined target catalyst output condition;
generating an output signal by applying a feedforward control that estimates an amount of decrease of a contaminant as a function of the first catalyst condition and the target catalyst output condition;
updating said output signal utilizing a feedback control that is a function of the target catalyst output condition and the second catalyst condition; and
providing a contaminant reducing agent to said catalyst in response to updating the output signal.

2. The method as described in claim 1 wherein said feedforward control is a direct inverse dynamic control.

3. The method as described in claim 1 wherein said feedforward control is a feedback inverse dynamic control.

4. The method as described in claim 1 wherein said contaminant reducing agent is urea.

5. The method as described in claim 1 wherein said first catalyst condition and second catalyst condition are the mass flow rate of the contaminants in the exhaust at first and second locations, respectively.

6. The method as described in claim 1 wherein a provider provides said contaminant reducing agent, said provider comprises: a contaminant reducing agent supply source; a supply line; a pump to pressurize said line; and an injector to atomize said contaminant reducing agent.

7. The method as described in claim 6 wherein said injector is operatively coupled to said selective reduction catalyst.

8. A method comprising:
providing a selective reduction catalyst having a catalyst input and a catalyst output operable to receive an exhaust stream therethough, the catalyst being operable to reduce NOx emission from the exhaust stream;
determining a first NOx condition at said catalyst input and a second NOx condition downstream from the catalyst input;
providing a predetermined target NOx output condition;
supplying a reducing agent to the catalyst to at least partially remove NOx from the exhaust stream;
in response to the supplying of the reducing agent, estimating an amount of NOx decrease with a feedforward control as a function of the first NOx condition and the target NOx output condition to generate a corresponding feedforward output signal;
generating a feedback output signal as a function of the target NOx output condition and the second NOx condition; and
adjusting supply of the contaminant reducing agent to the catalyst as a function of the feedforward output signal and the feedback output signal.

9. The method of claim 8, which includes producing the exhaust stream with a diesel engine.

10. The method of claim 8, wherein the determining of the first NOx condition and the second NOx condition, includes sensing NOx levels at two different points along the catalyst.

11. The method of claim 8, wherein the second NOx condition is determined at a catalyst output.

12. The method of claim 8, wherein the feedforward control is an inverse dynamic control.

13. The method of claim 8, wherein the contaminant reducing agent is urea.

14. A system comprising:
a diesel engine having an exhaust gas output producing exhaust gas containing contaminants;
a selective reduction catalyst having a selective catalytic reduction input and a selective catalytic reduction output, wherein said selective catalytic reduction input is operatively coupled to said exhaust gas output;
at least one sensor operatively coupled to said selective reduction catalyst;
a provider for providing a contaminant reducing agent to said catalyst; and
a control system utilizing a feedforward control to approximate how quickly said contaminants are reduced after providing said contaminant reducing agent to said catalyst and a feedback control, wherein said control system transforms data from said at least one sensor into an output signal that instructs said provider to inject said contaminant reducing agent to said catalyst.

15. The system as described in claim 14 wherein said feedforward control is a feedback inverse dynamic control.

16. The system as described in claim 14 wherein said feedforward control is an inverse dynamic control.

17. The system as described in claim 14 wherein said contaminant reducing agent is urea.

18. The system of claim 14 wherein the feedback control updates the output signal in response to an actual level of contaminants at the selective catalytic reduction output.

19. The system as described in claim 14 wherein said provider comprises: a contaminant reducing agent supply source; a supply line; a pump to pressurize said line; and an injector to atomize said contaminant reducing agent.

20. The system as described in claim 19 wherein said injector is operatively coupled to said selective catalyst reduction input.

* * * * *